United States Patent [19]

Hoshino

[11] Patent Number: 4,714,732

[45] Date of Patent: Dec. 22, 1987

[54] RUBBER COMPOSITION FOR TIRE INNER LINER

[75] Inventor: Takashi Hoshino, Tokyo, Japan

[73] Assignee: Bridgestone Corporation, Tokyo, Japan

[21] Appl. No.: 899,672

[22] Filed: Aug. 25, 1986

[30] Foreign Application Priority Data

Sep. 12, 1985 [JP] Japan ............................ 60-200589

[51] Int. Cl.$^4$ ..................... C08K 5/01; C08L 9/00; C08L 15/02

[52] U.S. Cl. ................................ 524/474; 524/525; 524/526

[58] Field of Search ............... 524/474, 525, 526, 484

[56] References Cited

U.S. PATENT DOCUMENTS

| | | | |
|---|---|---|---|
| 4,391,942 | 7/1983 | Nakauchi et al. | 524/474 |
| 4,591,617 | 5/1986 | Berta | 106/187 |
| 4,603,164 | 7/1986 | Chmiel et al. | 524/474 |

FOREIGN PATENT DOCUMENTS 0191299 11/1986 European Pat. Off. .

57-172945 10/1982 Japan .
57-195760 12/1982 Japan .

*Primary Examiner*—Allan M. Lieberman
*Attorney, Agent, or Firm*—Schwartz, Jeffery, Schwaab, Mack, Blumenthal & Evans

[57] ABSTRACT

A rubber composition for an inner liner of a vehicular tire, having high crack formation preventing characteristics even during vehicle cruising at low temperatures. The rubber composition comprises a rubber component and a softener. The rubber component includes halogenated butyl rubber ranging from 60 to 100 parts by weight and diene rubber not more than 40 parts by weight. The softener ranges from 3 to 15 parts by weight relative to 100 parts by weight of the rubber component and includes a paraffin component constituting not less than 60 weight % and an aromatics component constituting not more than 5 weight %. Additionally, the rubber component after vulcanization has a storage elastic modulus at 10° C., not higher than $1.4 \times 10^8$ dyn/cm$^2$, and a storage elastic modulus at $-45°$ C., not higher than $8.0 \times 10^9$ dyn/cm$^2$.

5 Claims, No Drawings

RUBBER COMPOSITION FOR TIRE INNER LINER

BACKGROUND OF THE INVENTION

1. Field of the Invention

The present invention relates generally to a rubber composition for an inner liner of a tire, and more particularly to improvements in an inner liner for a tire whose internal pressure is required to be securely maintained as particularly in radial-ply and bias-ply tires for passenger cars, tires for motorcycles, and tires for trucks and buses.

2. Description of the Prior Art

In connection with radial-ply and bias-ply tires of passenger cars, tires of motorcycles, and tires of trucks and buses, it is important to maintain the internal pressure of the tires. For this purpose, a rubber composition including as a main component a halogenated butylene rubber has been hitherto used as the inner liner of the tire as disclosed, for example, in published Japanese Patent Application Nos. 57-172945 and 57-195760.

Such a rubber composition including as the main component halogenated butylene rubber is useful from a view point of maintaining the internal pressure of tires. However, the rubber composition is inferior in stickiness due to the fact that its main component is halogenated butylene rubber, so that a sufficiently tight contact cannot be obtained between the inner liner and a tire casing during fabrication of a green tire. This will unavoidably allow air to enter between the inner liner and the tire casing after vulcanization. Additionally, a sufficient adhesive strength cannot be obtained between the inner liner and the tire casing, thereby causing peeling of the inner liner layer. Furthermore, because of insufficiently tight contact of the inner liner layer with the tire casing, lubricant and the like applied before vulcanization for the purpose of tight contact with a vulcanization bladder unavoidably enters to between the inner liner and the tire casing, so that a sufficient adhesive strength cannot be obtained between the inner liner layer and the tire casing. This will allow a crack to be formed or advanced where the lubricant and the like has entered, thereby causing breakdown of the inner liner and the tire casing.

In this regard, it is usual to blend a suitable amount of tackifier in order to increase the stickiness of the rubber composition of the inner liner layer. Examples of said tackifiers are phenol resins, terpene resins, and petroleum hydrocarbon resins. However, these resins unavoidably harden at low temperatures and therefore adversely affect the low-temperature characteristics of inner liners containing such resins, thereby permitting cracks to form in the inner liner when the vehicle is cruising at low temperatures. In view of this, blending a suitable amount of softener has been conventionally employed to improve the low-temperature characteristics. However, even with this measure, it has been difficult to maintain a proper balance between the desired high level of stickiness before vulcanization, and crack formation preventing characteristics during low temperature vehicle cruising and during normal vehicle cruising.

BRIEF SUMMARY OF THE INVENTION

It is an object of the present invention to provide an improved rubber composition for a tire inner lineer, which overcomes the above-mentioned shortcomings of conventional rubber compositions.

Another object of the present invention is to provide an improved rubber composition for a tire inner liner, which enables use of a desired tackifier without adversely affecting crack formation preventing characteristics during low temperature vehicle cruising and during normal vehicle cruising, while improving the characteristics before and after vulcanization.

The present invention has been completed as follows: The inventor of the present invention has noted the fact that the low temperature characteristics of the rubber of the inner liner varies throughout a wide range, and then made detailed investigation of the influence of the molecule structure of softeners on compatibility with halogenated butyl rubber and of the relationship between the molecule structure of the softeners and the low temperature characteristics of the inner liner rubber. As a result, the inventor has found that a desired stickifier can be used by maintaining storage elastic moduli at 10° C. and at −45° C. of the inner liner rubber after vulcanization within certain ranges, respectively, when using a softener having specified components.

Thus, the rubber composition of the present invention comprises a rubber component including halogenated butyl rubber ranging from 60 to 100 parts by weight, and diene rubber not more than 40 parts by weight. Additionally, a hydrocarbon oil softener ranging from 3 to 5 parts by weight is blended with 100 parts by weight of the rubber component. The softener includes a paraffin component constituting not less than 60 weight%, and an aromatics component constituting not more than 5 weight%. Additionally, the rubber composition after vulcanization has a storage elastic modulus at 10° C., not higher than $1.4 \times 10^8$ dyn/cm$^2$, and a storage elastic modulus at −45° C., not higher than $8.0 \times 10^9$ dyn/cm$^2$.

DETAILED DESCRIPTION OF THE INVENTION

According to the present invention, there is provided a rubber composition for an inner liner of a tire, the inner liner being securely disposed on the inner surface of the tire in order to maintain the internal pressure of the tire. The rubber composition comprises a rubber component including halogenated butyl rubber ranging from 60 to 100 parts by weight, and diene rubber not more than 40 parts by weight. The rubber component further includes a hydrocarbon oil softener ranging from 3 to 15 parts by weight relative to 100 parts by weight of said rubber component, the softener including a paraffin component constituting not less than 60 weight%, and an aromatics component constituting not more than 5 weight%. Additionally, the storage elastic modulus of the rubber composition after vulcanization is set at a value not higher than $1.4 \times 10^8$ dyn/cm$^2$ at 10° C. and at a value not higher than $8.0 \times 10^9$ dyn/cm$^2$ at −45° C.

Although the rubber component of the rubber composition of the tire inner liner contains the halogenated butyl rubber ranging from 60 to 100 parts by weight and diene rubber not more than 40% by weight for the purpose of maintaining the internal pressure of the tire, it is preferable that the softener within the above-mentioned range is blended with a rubber component including butyl rubber ranging from 80 to 100 parts by weight halogenated butyl rubber and not more than 20 parts by weight diene rubber in order to make the present invention more effective.

Examples of the halogenated butyl rubbers are chlorobutyl rubber, bromobutyl rubber and derivatives and modified rubbers of chlorobutyl rubber and bromobutyl rubber.

If less than 3 parts by weight softener are blended with 100 parts by weight of the rubber component, the desired low temperature characteristics cannot be obtained, while if the amount of softener exceeds 15 parts by weight, the green modulus of the rubber composition before vulcanization decreases, and therefore the inner liner becomes too soft. As a result, there arise problems in which ply cords project over the inner liner during fabrication of the tire, and the breaking strength of the inner liner decreases after vulcanization. Accordingly, a suitable blending amount of the softener relative to 100 parts by weight of the rubber component ranges from 3 to 15 parts by weight, preferably from 4 to 8 parts by weight.

Additionally, if the softener contains the paraffin component less than 60% by weight of the paraffin component and the aromatics component exceeds 5% by weight, the softener tends to harden, so that sufficient low temperature characteristics cannot be attained. Furthermore, it is difficult to obtain the above-mentioned required storage elastic modulus if amounts of softener contains the paraffin and aromatic components which are outside the respective ranges of the present invention.

With respect to the storage elastic modulus at 10° C. after vulcanization, if it exceeds $1.4 \times 10^8$ dyn/cm$^2$, cracks tend to be formed in the inner liner during normal vehicle cruising. The storage elastic modulus at 10° C. is preferably not higher than $1.2 \times 10^8$ dyn/cm$^2$, and more preferably not higher than $1.0 \times 10^8$ dyn/cm$^2$. Additionally, with respect to the storage elastic modulus at $-45°$ C. after vulcanization, if it exceeds $8.0 \times 10^9$ dyn/cm$^2$, cracks tend to be formed in the inner lineer during vehicle cruising at low temperatures. The storage elastic modulus at $-45°$ C. after vulcanization is preferably not higher than $6.0 \times 10^9$ dyn/cm$^2$.

It will be understood that usual compounding ingredients such as carbon black, resin, tackifier, adhesive, stearic acid, zinc flour (zinc white), vulcanizing agent, vulcanization accelerator and sulfur may be suitably blended with the rubber composition.

The present invention will be more clearly understood with reference to the following Examples and Comparative Examples.

EXAMPLES

Examples 1–4 and Comparative Examples 1–2

Four kinds of rubber compositions (Examples 1 to 4) according to the present invention and two kinds of rubber compositions (Comparative Examples 1 and 2) which are outside the scope of the present invention were prepared in the blending proportions (parts by weight) shown in the following table. It is to be noted that resultant rubber compositions of Examples 1 to 4 had storage elastic moduli (both at 10° C. and $-45°$ C.) within the ranges of the present invention, while the resultant rubber compositions of Comparative Examples 1 and 2 had storage elastic moduli (both at 10° C. and $-45°$ C.) outside the ranges of the present invention.

EXPERIMENTS

Storage Elastic Modulus

The storage elastic modulus was measured as follows: An elongate rectangular sheet of each rubber composition after vulcanization was formed as a specimen. The storage elastic modulus of the specimen was measured by using a spectrometer made by Iwamoto Seisakusho Co., Ltd. (in Japan) at a frequency of 50 Hz and a periodic extension distortion of 0.1% at 10° C. and at $-45°$ C. The measurement of this storage elastic modulus is according to JIS (Japanese Industrial Standard) K6394.

Next, the respective rubber compositions shown in the Table, were inspected as to whether cracks were produced or not. This test was conducted as follows:

Crack Formation during Vehicle Cruising at Low Temperatures

Each rubber composition shown in the Table was applied as an inner liner to a tire having a tire size P195/75R14 (according to TRA). A field test was conducted in a cold district in Canada, in which an automotive vehicle provided with the tire was actually driven about 10,000 Km. Thereafter, inspection was made as to whether cracks were formed or not.

Crack Formation during Normal Vehicle Cruising

Each rubber composition shown in the Table was applied as an inner liner to a tire having a tire size 165SR14 (according to JATMA and ETRTO). A field test was conducted in an urban area including Setagaya-ku, Tokyo, Japan, in which a taxicab provided with the tire was actually driven 40,000 Km. Thereafter, inspection was made as to whether cracks were formed or not.

The experimental results of the above-mentioned tests are shown in the following Table.

TABLE

| | Examples | | | | Comparative Examples | |
|---|---|---|---|---|---|---|
| | 1 | 2 | 3 | 4 | 1 | 2 |
| Bromobutyl rubber/natural rubber | 100/0 | 100/0 | 100/0 | 80/20 | 100/0 | 100/0 |
| Carbon black GPF (N660) | 60 | 60 | 60 | 55 | 60 | 60 |
| Softener A[1] | 4 | 7 | 7 | — | — | — |
| Softener B[2] | — | — | — | 10 | — | — |
| Softener C[3] | — | — | — | — | 8 | 10 |
| Escorez 1102[4]/Brown asphalt | 3/3 | 5/5 | 3/3 | 5/5 | 5/5 | 3/3 |
| Stearic acid | 2 | 2 | 2 | 2 | 2 | 2 |
| Zinc flour | 4 | 4 | 4 | 4 | 4 | 4 |
| dibenzothiazyldisulfide | 2 | 2 | 2 | 2 | 2 | 2 |
| Tetramethylthiuramdisulfide | 0.2 | 0.2 | 0.2 | 0.2 | 0.2 | 0.2 |
| Sulfur | 1 | 1 | 1 | 1 | 1 | 1 |
| Storage elastic modulus at 10° C. ($\times 10^8$ dyn/cm$^2$) | 1.3 | 0.6 | 0.9 | 0.5 | 1.5 | 1.9 |

TABLE-continued

| | Examples | | | | Comparative Examples | |
|---|---|---|---|---|---|---|
| | 1 | 2 | 3 | 4 | 1 | 2 |
| Storage elastic modulus at $-45°$ C. ($\times 10^9$ dyn/cm$^2$) | 7.6 | 6.2 | 5.3 | 5.4 | 9.6 | 8.6 |
| Crack formation during vehicle cruising at low temperatures | None | None | None | None | Three locations | slight |
| Crack formation during normal vehicle cruising | None | None | None | None | Slight | Four locations at shoulder section |

[1] Paraffin component 65%, naphthene component 34.5% aromatics component 0.5%
[2] Paraffin component 70%. naphthene component 28.5%, Aromatics component 1.5%
[3] Paraffin component 30%, naphthene component 40%, Aromatics component 30%
[4] Trade name, a tackifier made by Exxon Chemicals.

The experimental results in the Table demonstrate that the rubber compositions according to the present invention exhibit excellent crack formation preventing characteristics both during low temperature vehicle cruising and during normal vehicle cruising as compared with the rubber compositions of the comparative examples.

As appreciated from the above, according to the present invention, the storage elastic moduli at 10° C. and $-45°$ C. after vulcanization, of the rubber composition are respectively maintained within predetermined ranges by using a hydrocarbon oil softener having specified components, thus enabling use of desired tackifier without adversely affecting crack formation preventing characteristics during low temperature vehicle cruising and during normal vehicle cruising. In addition to the above, the rubber composition can be improved in stickiness before vulcanization and therefore improved in adhesion with the tire casing after vulcanization.

What is claimed is:

1. A rubber composition for an inner liner of a tire, comprising:
    a rubber component including halogenated butyl rubber ranging from 60 to 100 parts by weight, and diene rubber not more than 40 parts by weight; and
    a hydrocarbon oil softener ranging from 3 to 15 parts by weight relative to 100 parts by weight of said rubber component, said softener including a paraffin component constituting not less than 60 weight%, and an aromatics component constituting not more than 5 weight%;
    said rubber composition having a storage elastic modulus at 10° C. after vulcanization, not higher than $1.4 \times 10^8$ dyn/cm$^2$, and a storage elastic modulus at $-45°$ C., not higher than $8.0 \times 10^9$ dyn/cm$^2$.

2. A rubber composition as claimed in claim 1, wherein said rubber component includes from 80 to 100 parts by weight halogenated butyl rubber, and not more than 20 parts by weight diene rubber.

3. A rubber composition as claimed in claim 1, wherein said halogenated butyl rubber is selected from the group consisting of chlorobutyl rubber, bromobutyl rubber, and derivative and modified rubbers of chlorobutyl rubber and bromobutyl rubber.

4. A rubber composition as claimed in claim 1, wherein said softener is present in an amount ranging from 4 to 8 parts by weight relative to 100 parts by weight of said rubber component.

5. A rubber composition as claimed in claim 1, further comprising at least one component selected from the group consisting of carbon black, tackifier, adhesive, stearic acid, zinc flour, vulcanizing agent, vulcanization accelerator, and sulfur.

* * * * *